United States Patent Office 3,282,889
Patented Nov. 1, 1966

3,282,889
DI BETA NAPHTHYL-p-PHENYLENE DIAMINE STABILIZED PROPYLENE POLYMERS
Arthur R. Tomlinson, Chester, Pa., assignor to FMC Corporation, Philadelphia, Pa., a corporation of Delaware
No Drawing. Filed Aug. 12, 1964, Ser. No. 389,211
6 Claims. (Cl. 260—45.9)

This application is a continuation-in-part of my application Serial No. 46,095, filed July 29, 1960, now abandoned.

This invention relates to the stabilization of propylene polymers, and more particularly, to new compositions of matter comprising a solid crystalline polymer of propylene and an inhibitor, as well as a novel process for preparing stabilized shaped articles from said polymers.

Polymers which are included in the compositions of this invention are the relatively high molecular weight solid crystalline polymers of propylene. These polymers may be homopolymers or block copolymers. With regard to such block copolymers and their preparation, see for example, Church application Serial No. 700,761 filed December 15, 1957, Schneider et al. application Serial No. 90,173 filed February 20, 1961, now abandoned, and Khelghatian et al. application Serial No. 244,281 filed December 13, 1962, which applications are incorporated herein by reference.

Such polymers can be prepared by the polymerization of the olefin, or olefins, using a solid catalytic material. A catalyst which is especially effective for the polymerization of propylene to relatively high molecular weight solid polymers is the combination of a lower halide of titanium, such as titanium trichloride, and an aluminum compound having the formula $R_1R_2R_3Al$ wherein $R_1$ is hydrocarbon and each of $R_2$ and $R_3$ are the same or different hydrocarbon or halogen groups, such as aluminum triethyl, diethyl aluminum chloride or ethyl aluminum dichloride. This type of catalyst can be prepared by admixing, for example, titanium tetrachloride and aluminum triethyl in an inert solvent, such as isooctane or other hydrocarbons. This mixture acts as a catalyst for polymerizing the alpha-olefin to solid polymers. If desired, a lower halide such as titanium trichloride can be preformed, dispersed in an inert liquid, and an activator, such as one of the foregoing aluminum compounds, added. The polymerization process comprises contacting propylene with the solid catalyst, such as by passing the olefin into the liquid reaction mixture thereby to polymerize said olefin to solid polymers. Anhydrous and oxygen-free conditions are used throughout the process, since the catalyst is deactivated by contact with water or oxygen.

In addition to the foregoing, the following applications, incorporated herein by reference, illustrate block copolymer processes and catalysts suitable for the preparation of the propylene block copolymers contemplated by the present application, Jezl et al. application Serial No. 241,032 filed November 29, 1962 and Jezl et al. application Serial No. 243,613 filed Decmber 10, 1962. Other specific catalyst systems, i.e. other metal halide or metal oxide catalyst systems, as well as other process conditions, necessary for the preparation of the polypropylene described herein are illustrated by pages 350 through 361, pages 416 through 419, page 452 and page 453 of "Linear and Stereo-Regular Addition Polymers" by Norman G. Gaylord and Herman F. Mark, Interscience Publishers, 1959, the contents of which are incorporated herein by reference.

Propylene homopolymers and block copolymers as above-described have a crystalline melting point of from 160° C. to 170° C., a tensile strength of from 3,000 to 6,000 p.s.i. (pounds per square inch), and an average molecular weight of from 50,000 to 850,000 or more (determined by light-scattering). Usually, a mixture of crystalline and amorphous polymer is obtained. If desired, amorphous polymer can be separated from the crystalline polymer by contacting a mixture thereof with a hydrocarbon solvent, such as isooctane or n-heptane, at an elevated temperature. The amorphous polymer is substantially soluble under these conditions whereas the crystalline polymer is substantially insoluble. The compositions of the present invention are prepared from either crystalline or mixtures of crystalline with amorphous polymers in which the mixture contains at least 25% by weight, and preferably at least 50% by weight, of the crystalline polymer. In addition to the foregoing characteristics, the block copolymers contemplated by this invention, as aforesaid, have improved impact strength even at low temperatures.

Such polymers may be molded or otherwise fabricated to form many useful articles. However, propylene polymers are susceptible to degradation caused by heat, oxidation, mechanical working, and light (especially ultra-violet light). This degradation apparently results from free-radical formation within the polymer molecules, which formation is promoted by oxygen, heat, mechanical action, impurities (such as metals and metal compounds), and light. The free-radicals which are formed undergo chemical reaction with the polymer itself, resulting in undesirable chemical and physical transformations. Thus, the propylene polymers deteriorate prematurely, lose tensile strength and other desirable properties such as pliability and impact strength, and become discolored and embrittled.

An object of the present invention is to provide compositions comprising the above-described solid, crystalline homopolymers and solid, crystalline block copolymers of propylene containing a minor, but stabilizing quantity, of a material effective to inhibit degradation of said polymers. It is a specific object of this invention to provide compositions comprising the above-described polymers containing minor quantities of a stabilizing material effective to substantially prevent degradation of the polymer caused by exposure to light, particularly the ultra-violet portion of the spectrum. It is another object of this invention to provide a process for the formation of shaped articles derived from the aforesaid polymers which are stabilized against degradation resulting from the aforesaid causes.

According to one embodiment of the present invention, it has been found that remarkably stable polymer compositions may be prepared by admixing with the substantially crystalline, solid, propylene polymer a stabilizing quantity of di-beta-naphthyl-para-phenylene diamine having the formula:

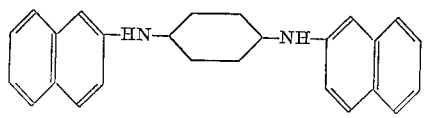

The use of a stabilizing quantity, i.e. from about 0.05% to about 5% by weight of the diamine of this invention, preferably about 0.2% to about 2.0%, in combination with the propylene polymers described herein imparts remarkable stability thereto against degradation caused by exposure to heat and to light, particularly that portion of the spectrum which includes ultra-violet light. Thus, stability is imparted to the polymer during fabrication techniques wherein high temperatures are used, as well as during use of so-formed shaped articles in the presence of heat or light.

Numerous stabilizers have been disclosed in the prior art for arresting degradation of other polymers. However, it has been found that virtually none of them are useful in the propylene polymers of this invention; see, for example, page 192, volume 37, No. 5 of "Modern Plastics," January 1960. Moreover, as is shown herein below, beta-naphthyl phenylamine, having the formula:

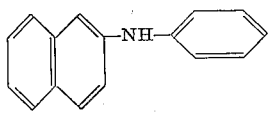

is entirely ineffective as a stabilizer for the propylene polymers of this invention notwithstanding its close structural relationships to the amine of this invention. In addition, numerous other compounds known as stabilizers for other polymers are shown hereinbelow to be entirely ineffective in the polymers of this invention. It is clear then that the probable mechanism by which the polymers known heretofore degrade is entirely different from the mechanism by which polymers of this invention degrade. Accordingly, the mechanism by which polymers of this invention are stabilized is unrelated to that by which said other polymers are stabilized.

The stabilizer may be combined with the propylene polymer by any method suitable for the preparation of homogeneous mixtures. For example, the polymer may be melted and the stabilizer admixed therewith by milling on heated rolls, by using a Banbury mixer, by using a melt-extrusion device or other device wherein melting and mixing are accomplished. Alternatively, the stabilizer may be combined, in a solid or molten state, with a solution or suspension of the polymer in a suitable liquid. In another process, one dissolves the stabilizer in a suitable solvent, admixes powdered polymer therewith, and evaporates the solvent. In another mode of operation, the solid stabilizer is thoroughly dry-mixed with the solid polymer. In general, it is preferable that the mixing process be carried out in an inert atmosphere, or under vacuum, in order to prevent oxidation of the polymer.

As indicated above, it is an object of this invention to provide a process for the formation of shaped articles derived from the polymers of this invention, which shaped articles are stabilized against degradation resulting from heat or light. Said process involves intimately mixing the polymer with the stabilizer to provide a homogeneous mixture thereof, heating said mixture sufficiently to melt the polymer and forming shaped articles from said melt. The mixing step may be entirely separate from the melting step, or these steps may be performed simultaneously. In a preferred embodiment the polymer and the stabilizer are mixed prior to melting; however, to insure a homogeneous mixture mixing is continued during the melting step. For example, this preferred procedure can be performed in a conventional melt extruder by introducing a premixed polymer-stabilizer composition thereinto. The shaped articles contemplated by this invention include films, fibers, pellets and other shapes fabricated by conventional melt-extrusion, injection-molding, thermoforming, blow-molding, compression-molding, transfer-molding, powder-molding, or casting techniques.

Several criteria are used to determine the effectiveness of the stabilizers in the compositions of this invention. Since non-stabilized polypropylene is normally drastically degraded when exposed to ultra-violet and visible light, particularly the high ultra-violet and the low visible light, the extent of this degradation is measured. One method of determining the extent of degradation involves the use of the Carbon-Arc Lamp Test in the Atlas Fade-ometer substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not there has been any breakage. If so, the test is terminated; if not the test is continued until breakage occurs. Meanwhile, at 60 hour intervals the filaments may also be tested on an Instron Tensile Tester and compared with unexposed filaments. In the illustrative examples given below, the filaments (i.e., mono- or multi-filaments) are wound on standard black faced "mirror" cards (6½ x 9⅓ inches) and secured thereto at the margin with cellophane tape. Winding thereof is performed using a Universal winding device at a tension of 0.75 g., and when so-wound, each card contains 3 groups of filaments having 5 to 8 monofilaments or multifilaments in each group.

In addition to degradation caused by exposure to light, non-stabilized polypropylene is rapidly degraded by exposure to elevated temperature during fabrication and use. Virtually none of the materials known as ultra-violet stabilizers for other polymers contribute to the heat stability of that polymer. Unexpectedly the diamine of this invention imparts both light stability and heat stability to polypropylene. In the examples given below, heat stability is measured on polypropylene monofilaments by placing cards thereof, wound in the same manner as in the Fade-ometer testing, in an oven maintained at an elevated temperature. The oven life recorded in the examples constitutes the number of hours the polypropylene filaments were exposed to this temperature without breaking.

The following examples are given by way of illustration and not by way of limitation, the scope of the invention being determined by the appended claims.

EXAMPLES 1–4

Polypropylene monofilaments containing 0.0, 1.0, 1.5 and 2.0% by weight of di-beta-naphthyl-para-phenylene diamine were exposed in an Atlas Fade-ometer, and duplicates thereof were exposed in an air oven at 115° C., giving the results tabulated as Examples 1 through 4 respectively.

TABLE I

| Example | Denier | Fade-ometer Hours to Break | Percent Tenacity Retained, Fade-ometer Hrs. | Oven (Hrs.) |
| --- | --- | --- | --- | --- |
| 1 | 180 | 0–20 | None at 20 | 9–17 |
| 2 | 134 | 280–300 | 52% at 240 | >560 |
| 3 | 183 | 460–480 | 50% at 300 | >1,030 |
| 4 | 180 | >520 | 56% at 300 | >1,030 |

Thus non-stabilized polypropylene monofilaments broke in the Fade-ometer in less than 20 hours. By contrast, the filaments containing 1% by weight of the diamine of this invention broke at a point in excess of 280 hours and less than 300 hours, those containing 1.5% of this diamine broke in the Fade-ometer at a point between 460 and 480 hours, and those containing 2% had not broken at 520 hours. Of equal significance, whereas the non-stabilized polypropylene monofilaments failed in the 115° C. air oven at some point between 9 and 17 hours, those containing 1% of the diamine had not failed at 560 hours, while those containing 1.5 to 2.0% of the diamine had not failed at 1030 hours.

Controls A-C

Polypropylene monofilaments containing 1.0, 1.5 and 2.0% by weight of beta-naphthyl phenylamine were exposed in the Fade-ometer giving the data tabulated in Table II as Controls A through C respectively.

TABLE II

| Control | Denier | Fade-ometer Hours to Break | Percent Tenacity Retained, Fade-ometer Hours |
|---|---|---|---|
| A | 180 | 20-40 | None at 40. |
| B | 180 | 40-60 | None at 60. |
| C | 180 | 40-60 | Do. |

Table II contrasts the relative ineffectiveness of closely related beta-naphthyl phenylamine with the effectiveness of the diamine of this invention shown by Table I.

EXAMPLES 5-8

Polypropylene monofilaments having a denier of 150 and containing 0.0, 0.75, 1.0 and 1.5% by weight of di-beta-naphthyl-para-phenylene diamine were exposed in an Atlas Fade-ometer, and duplicates thereof were exposed in an air oven at 125° C., giving the data tabulated in Table III as Examples 5 through 8 respectively.

TABLE III

| Example | Fade-ometer Hours to Break | Percent Tenacity Retained, Fade-ometer Hours | 125° C. Air Oven (Hours) |
|---|---|---|---|
| 5 | 0-20 | None at 20 | 5-6 |
| 6 | 160-180 | 62% at 120 | >160 |
| 7 | 240-260 | 27.9% at 240 | >320 |
| 8 | 400-420 | 33% at 300 | >550 |

Table III confirms the excellent heat and light stability of polypropylene containing the diamine of this invention. Whereas non-stabilized polypropylene fails in the Fade-ometer in less than 20 hours, polypropylene containing 0.75 to 1.5% of di-beta-naphthyl-para-phenylene diamine does not break between 160 and 400 hours. On the other hand, non-stabilized polypropylene broke at 125° C. in less than 6 hours, while polypropylene containing 0.75 to 1.5% of the diamine stabilizer had not broken at 160 to 550 hours.

EXAMPLES 9-11

Polypropylene monofilaments having a denier of 150 and containing di-beta-naphthyl-para-phenylene diamine (D in Table IV) and 2,5-ditertiarybutyl hydroquinone (H in Table IV), in the amounts specified below as percent by weight, were exposed in an Atlas Fade-ometer resulting in the data tabulated in Table IV.

TABLE IV

| Example | Stabilizer | Fade-ometer Hours to Break | Percent Tenacity Retained, Fade-ometer Hours |
|---|---|---|---|
| 9 | 0.95% of D and 0.05% of H. | 300-320 | 17.5% at 300. |
| 10 | 1.9% of D and 0.1% of H. | 640-660 | 57.2 at 240. |
| 11 | None | 0-20 | None at 20. |

Thus polypropylene monofilaments containing 0.95% by weight of the diamine of this invention and 0.05% by weight of the foregoing alkylated hydroquinone broke in the Fade-ometer between 300 and 320 hours, whereas those containing twice these amounts broke in the Fade-ometer between 640 and 660 hours.

EXAMPLES 12-14

Example 2 is repeated, substituting the crystalline propylene-ethylene block copolymers I, II, and III (described hereinbelow) for the polypropylene thereof. Each of said copolymers, compounded and fabricated into filaments as in Example 2, has an oven life in excess of 550 hours; moreover, no filament breaking is observed in the Fade-ometer after 260 hours. In contrast to these observations, each of said copolymers compounded and fabricated as in Example 1, fails in the Fade-ometer and in the oven in 20 hours or less.

EXAMPLES 15-17

Example 4 is repeated, substituting the crystalline propylene-ethylene block copolymers I-III for the polypropylene thereof. Each of said copolymers has an oven life in excess of 1,000 hours and a Fade-ometer life in excess of 500 hours.

Preparation of block polymers (I) Polymerization was carried out in accordance with the following procedure. A pressure reactor fitted with stirring means was flushed with nitrogen, and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. The contents of the reactor were then brought to a temperature of 162° F., hydrogen was added in an amount of 16 parts per million by weight based on the weight of the hexane, and propylene was pressured in at 75 p.s.i.g. Polymerization of propylene commenced immediately, and was continued for 85 minutes, after which flow of pure propylene was discontinued, and a second feed, which consisted of 24% ethylene and 76% propylene, was pressured into the reactor. Polymerization was continued with this feed for 85 minutes, after which the reaction was killed by the addition of methanol. The reaction product was worked up, and a solid, highly crystalline block polymer was recovered. The total polymer contained 7.2% ethylene, as calculated from a material balance, and the solid block polymer, which amounted to 80% of the total polymer had a flow rate of 2.3, a brittle point of −13.5° C., as determined by ASTM D746-57T and a tensile impact strength as determined by ASTM 1822-61T of 94. Pure polypropylene of this flow rate has a brittle point of 14° C. and a tensile impact strength of 28.

(II) A water jacketed polymerization reactor was charged with n-hexane, titanium trichloride, ethyl aluminum dichloride, and ethyl orthosilicate in quantities such that the hexane contained 0.07 gram of titanium trichloride per 100 cc. and the mol ratio of ethyl aluminum dichloride to titanium trichloride to ethyl orthosilicate was 2:1:0.65. The reactor contents were brought to 160° F. Hydrogen was added to the reactor in an amount of 16.5 parts per million by weight based on the weight of the hexane. The reactor was then pressured with 75 p.s.i.g. propylene partial pressure. The total pressure was 81 p.s.i.g., 6 p.s.i.g. being due to hydrogen and hexane partial pressures. Polymerization started immediately and was continued for 94 minutes while maintaining the pressure at 81 p.s.i.g. Flow of propylene was then discontinued, and a mixture of 20% ethylene and 80% propylene was introduced into the reactor at a pressure of 81 p.s.i.g. Polymerization was continued for 196 minutes with this feed stock, after which the reaction was stopped by the addition of methanol. By material balance, it was calculated that the total product recovered from the reactor, which was 83% insoluble in boiling pentane, contained 4.8% ethylene. The product, which had a flow rate of 2.4, was molded into test pieces, and the brittle point was determined by ASTM D746–57T, and tensile impact by ASTM D1822–61T. The brittle point was −4.5° C. and the tensile impact was 44. Polypropylene having a flow rate of 2.4 has a brittle point of 13° C. and a tensile impact of 28.

(III) Copolymerization was carried out in accordance with the following procedure. A pressure reactor fitted with stirring means was flushed with nitrogen and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. of hexane. The contents of the reactor were then brought to a temperature of 160° F., hydrogen was added in an amount of 20 parts per million by weight based on the weight of the hexane, and a mixture of 3 mol percent ethylene and 97% propylene was pressured in at 75 p.s.i.g. Polymerization started immediately and was continued for 12 minutes, while maintaining the pressure constant by the addition of the mixture. This feed was then discontinued and a second feed consisting of ethylene alone was pressured into the reactor for 1 minute, after which flow of the first feed to the reactor was resumed. This was repeated several times, the entire polymerization cycle being as follows.

| Feed: | Time in minutes |
|---|---|
| 1st | 20 |
| 2nd | 8 |
| 1st | 27 |
| 2nd | 15 |
| 1st | 45 |
| 2nd | 19 |
| 1st | 56 |

The reaction was terminated by the addition of methanol, and a solid crystalline propylene-ethylene block copolymer having the following characteristics was recovered: percent ethylene in the total product=11.5, flow rate=1.8, brittle point=−9.0° C., izod impact=1.3 ft. lbs./in., tensile impact=47.3 ft. lbs./in., yield tensile strength at 1 in. per minute=3500 p.s.i., tensile strength at 1 in. per minute=4300 p.s.i., percent elongation at 1 in. per minute=376, tensile modulus=106,000 and flexural modulus=120,000.

Controls D through N

Examples 2–4 and 6–8 were repeated with the additives tabulated in Table V, the quantity of additive being in weight percent of additive as related to weight of polypropylene.

TABLE V

| | | Additive | Fadeometer Hours to Break | Oven Life, 125° C. |
|---|---|---|---|---|
| D | 0.5 | 2-hydroxy-4-methoxybenzophenone | 20 | 15 |
| E | 0.5 | 2,2′-dihydroxy-4-methoxybenzophenone (average of 3 tests). | 40 | 15 |
| F1 | 0.25 | 2-6-bis-(2-hydroxy-3-t-butyl-5-methyl-benzyl)-durene. | 40 | 15 |
| F2 | 0.5 | ----do---- | 40 | 15 |
| F3 | 1.0 | ----do---- | 40 | 15 |
| F4 | 1.5 | ----do---- | 40 | 15 |
| F5 | 2.0 | ----do---- | 40 | 15 |
| G1 | 0.25 | 2,6-ditertiary butyl-4-methyl-phenol | 40 | 16 |
| G2 | 0.5 | ----do---- | 40 | 16 |
| G3 | 1.0 | ----do---- | 40 | 16 |
| G4 | 1.5 | ----do---- | 40 | 16 |
| G5 | 2.0 | ----do---- | 40 | 16 |
| H1 | 0.25 | Liquid styrenated phenol (Wingstay S) [1] | 40 | 17 |
| H2 | 0.5 | ----do.[1] | 40 | 17 |
| H3 | 1.0 | ----do.[1] | 40 | 17 |
| J1 | 0.25 | Epon 834 [2] (condensation product of epichlorohydrin and isopropylidene bis phenol). | 40 | 18 |
| J2 | 0.5 | ----do.[2] | 40 | 19 |
| K | 0.5 | Liquid organo tin sulfur compound (Thermolite 20).[3] | 40 | 15 |
| L1 | 0.5 | Dibutyltin dichloride | 40 | 16 |
| L2 | 1.0 | ----do---- | 40 | 16 |
| L3 | 1.5 | ----do---- | 20 | 16 |
| L4 | 2.0 | ----do---- | 40 | 16 |
| M1 | 0.25 | Dibutyltin maleate (Thermolite 13) [3] | 40 | 16 |
| M2 | 0.5 | ----do.[3] | 40 | 17 |
| M3 | 1.0 | ----do.[3] | 40 | 19 |
| N1 | 0.25 | Tetraphenyltin | 40 | 15 |
| N2 | 0.5 | ----do---- | 20 | 15 |
| N3 | 1.0 | ----do---- | 40 | 15 |
| N4 | 1.5 | ----do---- | 40 | 15 |
| N5 | 2.0 | ----do---- | 20 | 15 |

[1] Trademark of Goodyear Tire and Rubber Company for rubber non-staining antioxidant.
[2] Trademark of Shell Chemical Company for a polymer having the formula:

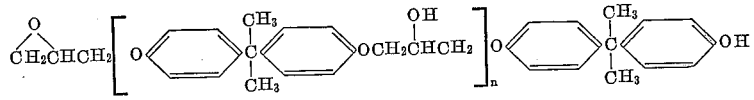

[3] Trademark of Metal & Thermit Corporation for organometallic compounds used as stabilizers for polyvinyl chloride.

Controls P through LL

Examples 2 through 4 and 6 through 8 were repeated with the additives tabulated in Table VI, the quantity of additive being weight percent of additive as related to the weight of polypropylene.

TABLE VI

| | | Additive | Fadeometer Hours to Break |
|---|---|---|---|
| P | 1.0 | 5-chloro-2-hydroxy-benzophenone | 40 |
| Q1 | 0.25 | 2,2'-dihydroxy-8-octoxy benzophenone | 40 |
| Q2 | 0.5 | -----do----- | 40 |
| R1 | 0.25 | 2,2',4,4'-tetrahydroxy-benzophenone | 40 |
| R2 | 0.5 | -----do----- | 40 |
| R3 | 1.0 | -----do----- | 40 |
| S1 | 0.5 | Disalicylal propylene diamine | 40 |
| S2 | 1.0 | -----do----- | 40 |
| T1 | 1.0 | p-Octyl-phenyl salicylate | 40 |
| T2 | 1.5 | -----do----- | 40 |
| T3 | 2.0 | -----do----- | 40 |
| U1 | 0.25 | 4-methyl-7-hydroxycoumarin | 20 |
| U2 | 0.5 | -----do----- | 40 |
| V | 0.5 | 2,5-di-t-amyl hydroquinone (Santovar A [1]) | 40 |
| W | 1.0 | Acetyl resorcinol | 20 |
| X | 1.0 | Dibenzoylresorcinol | 40 |
| Y | 1.0 | 2,6-bis-(2-hydroxy-3-t-butyl-5-methyl-benzyl)-4-methyl phenol (average of 2 tests) | 50 |
| Z | 0.5 | 2,2'-methylene-bis-(4-methyl-6-t-butyl phenol) (Antioxidant 2246).[2] | 40 |
| AA | 1.0 | 4,4'-methylene-bis-(2,6-diteritiary butyl phenol) (Ethyl 702).[3] | 40 |
| BB | 1.0 | (4-dimethylamino-phenyl)-4,5-diphenyl imidazole | 40 |
| CC | 1.0 | (2-methoxy-phenol)-4,5-diphenyl imidazole | 20 |
| DD | 1.0 | (4-hydroxy-phenyl)-4,5-diphenyl imidazole | 40 |
| EE | 1.0 | Octyl imidazole | 40 |
| FF | 1.0 | Undecenylimidazole | 40 |
| GG | 1.0 | Dodecylbenzyl-2-methyl imidazole | 40 |
| HH1 | 0.5 | Hexamethyl phosphoritriamide | 20 |
| HH2 | 1.0 | -----do----- | 20 |
| HH3 | 2.0 | -----do----- | 40 |
| II | 1.0 | Diphenyl guanadine | 40 |
| JJ | 0.5 | Liquid organo tin sulfur compound (Thermolite 31).[4] | 40 |
| KK | 1.0 | Dibutyltin dilaurate (Thermolite 12) [4] | 40 |
| LL | 0.25 | Liquid zinc compound (Thermolite 166) [4] | 20 |

[1] Trademark of Monsanto Chemical Company for rubber antioxidant.
[2] Trademark of American Cyanamid Company for rubber antioxidant.
[3] Trademark of Ethyl Corporation for rubber antioxidant.
[4] Trade of Metal & Thermit Corporation for organo-metallic compounds used as stabilizers for polyvinyl chloride.

Controls A through LL in Tables II, V and VI confirm the unobvious character of the present invention in that they show that various additives, including ultraviolet absorbers, polyvinyl chloride stabilizers, rubber antioxidant and polyethylene stabilizers, are ineffective to stabilize the polypropylene contemplated by this invention. Similarly, when the additives of Controls A through LL are tested by the same procedures in the block copolymers of this invention, they are found to be ineffective.

The invention claimed is:

1. A process comprising mixing a solid, substantially crystalline polymer of propylene with a stabilizing quantity comprising from about 0.05% to about 5.0% by weight of di-beta-naphthyl-para-phenylene diamine, melting the resulting mixture, and forming from said melted mixture fibers having improved resistance to environmental factors causing degradation, said crystalline polymer being selected from the group consisting of propylene homopolymers and block copolymers of propylene and at least one alpha-olefin from the group consisting of ethylene and alpha-olefins having between 4 and 10 carbon atoms.

2. The process of claim 1 wherein said polymer is a homopolymer of propylene.

3. The process of claim 2 wherein said stabilizing quantity is from about 0.2% to about 2% by weight of said mixture, and wherein said environmental factor causing degradation is ultraviolet light.

4. The process of claim 1 wherein said polymer is a block copolymer of propylene and at least one alpha-olefin selected from the group consisting of ethylene and alpha-olefins having between 4 and 10 carbon atoms.

5. The process of claim 4 wherein said polymer is a block copolymer of propylene and ethylene.

6. The process of claim 5 wherein said stabilizing quantity is from about 0.2% to about 2% by weight of said mixture, and wherein said environmental factor causing degradation is ultraviolet light.

References Cited by the Examiner

UNITED STATES PATENTS 2,985,617  5/1961  Salyer et al. _____ 260—45.95
3,029,224  4/1962  Fischer et al. _____ 260—45.95

OTHER REFERENCES

Natta Journal of Polymer Science, V. 34, January 1959, pp. 531–49.

LEON J. BERCOVITZ, *Primary Examiner*.

DONALD E. CZAJA, *Examiner*.

H. E. TAYLOR, *Assistant Examiner*.